United States Patent
Goyette

(10) Patent No.: US 9,526,261 B2
(45) Date of Patent: Dec. 27, 2016

(54) DRYING OF FOODSTUFFS

(71) Applicant: Bernard Goyette, Mont-Saint-Gregoire (CA)

(72) Inventor: Bernard Goyette, Mont-Saint-Gregoire (CA)

(73) Assignee: VINELAND RESEARCH AND INNOVATIONS CENTRE INC., Vineland Station, CA (US)

( * ) Notice: Subject to any disclaimer, the term of this patent is extended or adjusted under 35 U.S.C. 154(b) by 524 days.

(21) Appl. No.: 14/032,619

(22) Filed: Sep. 20, 2013

(65) Prior Publication Data

US 2015/0082657 A1   Mar. 26, 2015

(51) Int. Cl.
*A23B 7/02* (2006.01)
*A23L 3/40* (2006.01)

(52) U.S. Cl.
CPC ............. *A23B 7/0205* (2013.01); *A23L 3/40* (2013.01)

(58) Field of Classification Search
CPC ........ F26B 19/00; F26B 25/10; A23B 7/0205; A23L 3/40; A23N 12/08
See application file for complete search history.

(56) References Cited

U.S. PATENT DOCUMENTS

| 2,000,103 | A | * | 5/1935 | Shodron | ............... | A01F 25/08 34/225 |
| 2,278,571 | A | * | 4/1942 | Skinner | ............... | A23B 7/148 34/233 |
| 5,423,249 | A | | 6/1995 | Meyer | | |

(Continued)

FOREIGN PATENT DOCUMENTS

| CA | 2409066 | 4/2003 |
| EP | 1949804 A2 | 7/2008 |

(Continued)

OTHER PUBLICATIONS

Sagar, V.R. and Suresh, Kumar P. Recent advances in drying and dehydration of fruits and vegetables: a review. J Food Sci Technol (Jan.-Feb. 2010) 47(1):15-26.

(Continued)

*Primary Examiner* — Jiping Lu
(74) *Attorney, Agent, or Firm* — Brunet & Co. Ltd.; Robert A. H. Brunet; Hans Koenig

(57) ABSTRACT

An apparatus for drying foodstuffs involves a pallet supporting a stack of containers containing the foodstuffs. The pallet has a perimeter on which the stack of containers is sealingly supportable. The top of the pallet has at least one aperture to permit air flow therethrough, and the top, bottom and sides of the pallet define a ventilation duct for receiving air through the top of the pallet. A low pressure plenum in fluid communication and sealingly engaged with the ventilation duct draws air down vertically through the foodstuffs through the top of the pallet and out of the ventilation duct into the plenum. A drying installation involves the apparatus in a climate controlled room. A method of processing foodstuffs involves controlling temperature, relative humidity or both temperature and relative humidity of air in the room and drawing the air in the room vertically down past the foodstuffs until the foodstuffs are processed. The apparatus, installation and method are particularly useful for drying grapes by an Appassimento drying method.

13 Claims, 11 Drawing Sheets

(56) References Cited

U.S. PATENT DOCUMENTS

| | | | |
|---|---|---|---|
| 5,438,917 A | 8/1995 | Bolkestein | |
| 5,531,158 A | 7/1996 | Perryman, Jr. | |
| 5,566,608 A | 10/1996 | Vejdani | |
| 7,523,964 B2* | 4/2009 | Sandman | F16L 17/025 277/616 |
| 2011/0123698 A1 | 5/2011 | Meng | |

FOREIGN PATENT DOCUMENTS

| | | |
|---|---|---|
| EP | 1862075 B1 | 6/2009 |
| JP | 09056327 A * | 3/1997 |

OTHER PUBLICATIONS

Goyette B. Postharvest Handling of Okra and Eggplants. Presentation dated Feb. 2013.

Office Action dated Jun. 28, 2016 on corresponding Canadian application CA 2828028.

\* cited by examiner

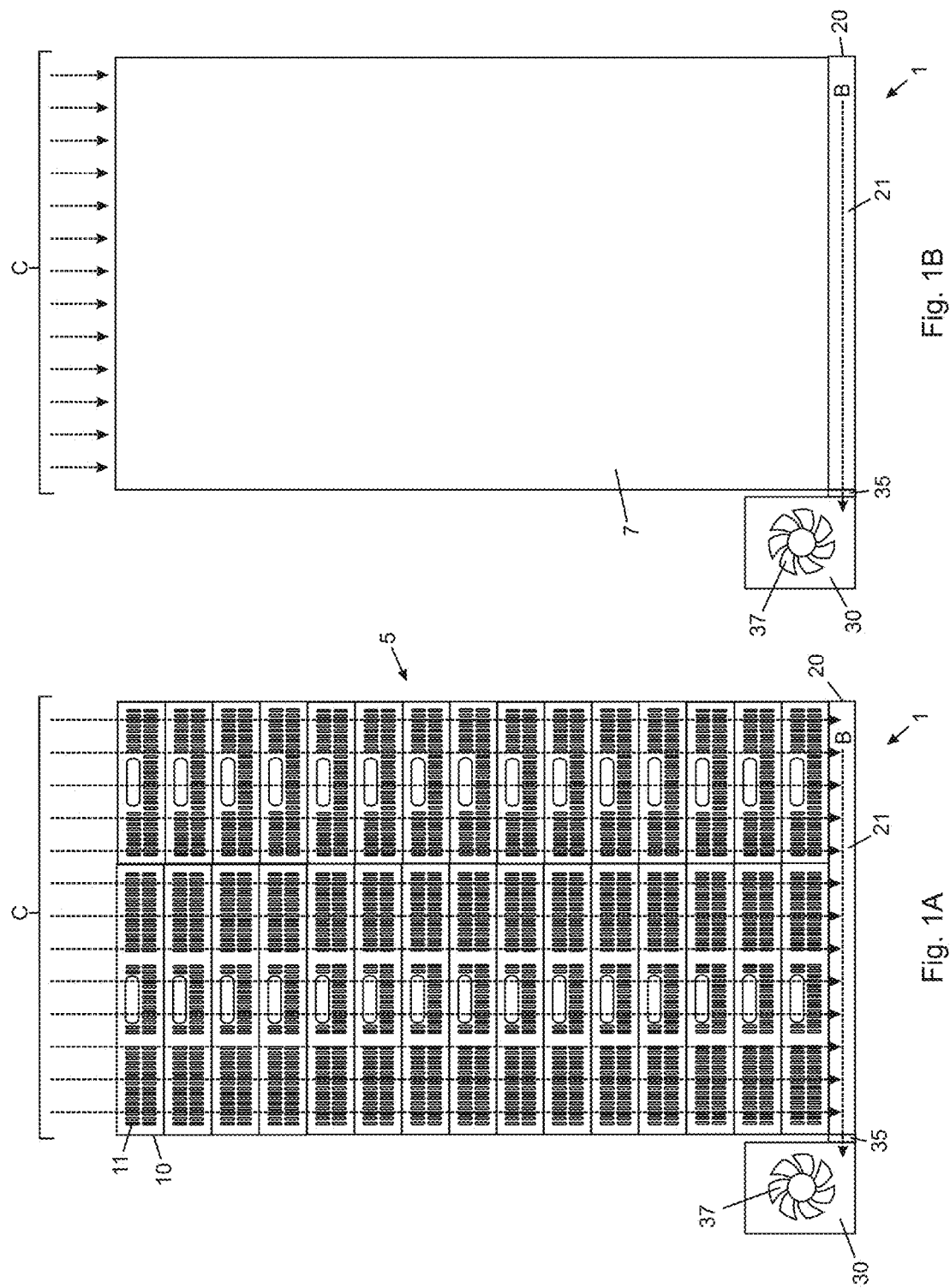

DRYING OF FOODSTUFFS

FIELD

This application relates to apparatuses, methods and installations for drying foodstuffs, for example fruits and vegetables, especially grapes.

BACKGROUND

Drying of foodstuffs is primarily done in an effort to preserve food for future use, or to convert one foodstuff into another. Many different methods and apparatuses have been developed to dry food, but one problem with drying food is preserving a desired food quality in the final product. Other than nutritional value, the quality most desired to be preserved is usually taste.

In the wine industry, berries may be first dried to reduce their moisture content. A berry is a fleshy fruit produced from a single ovary. Grapes are an example. The drying process concentrates and develops aromatic compounds, sugars and polyphenols in the berries. When the berries are sufficiently dry, they are further processed into wine.

Withering of berries can be achieved by over-ripening of the berries in the field either on or off the vines, or indoors under fully or partially controlled condition. Clusters of berries are typically placed on trays in a single layer. The structure and openings of the trays are important factors in facilitating air movement through and around the berry clusters, and also play an important role in preventing the growth of undesirable mold. The drying process can last up to 120 days and berries are usually crushed when they have lost 30% to 40% of their original weight.

Appassimento drying is a particular process developed in Italy, which occurs in dedicated lofts called fruttaio under specific environmental conditions and through an established method. In Appassimento wine production there are two lines of thought: the traditional method where natural drying conditions are an essential requirement; or new system designs by which postharvest stresses must be controlled and recorded. The main environmental conditions which are considered during drying are the temperature and the relative humidity (RH), which affect respiration rate. Airflow may also play a role. Certainly, in the traditional method, the day/night environmental variations are considered fundamental, as well as the specific containers used to hold the berries.

Traditional Italian wines made using the Appassimento method, such as Amarone, Recioto and Ripasso, command premium prices. However, wine makers in North American regions, for example Ontario, have difficulty creating wines using the Appassimento drying method due to inconsistent results, losses from mold and the labor intensive nature of the traditional Appassimento drying method. In order to take advantage of the market niche for wines made using the Appassimento drying method, it would be desirable to have a method by which berries may be dried to achieve the same or similar result as the traditional Appassimento method.

SUMMARY

There is provided an apparatus for drying foodstuffs, comprising: a pallet having sides, a bottom and a top, the top of the pallet configured to support a stack of containers from a bottom of the stack, the pallet comprising elongated support members forming a perimeter on which the stack is sealingly supportable, the top of the pallet comprising at least one aperture to permit air flow therethrough, the top, bottom and sides of the pallet defining a ventilation duct for receiving air through the top of the pallet; and, a low pressure plenum in fluid communication and sealingly engaged with the ventilation duct, the low pressure plenum configured to draw air down vertically through the top of the pallet and out of the ventilation duct into the plenum.

There is further provided an installation for drying foodstuffs, comprising: a climate controlled room; and, an apparatus as defined above situated in the climate controlled room.

There is further provided a method of processing foodstuffs, comprising providing foodstuffs in a plurality of containers in the apparatus in the installation as defined above, controlling temperature, relative humidity or both temperature and relative humidity of air in the room, and drawing the air in the room vertically down past the foodstuffs until the foodstuffs are processed.

The apparatus comprises a pallet on which a stack of containers may be supported. The pallet comprises elongated support members forming a perimeter. The perimeter may be square or rectangular in shape, although other shapes such as triangular circular or ellipsoidal may be used. The pallet may be conveniently sized to be moveable by a standard fork lift. Each elongated support member may define a side, top or bottom of the pallet, and other elongated support members may be employed in different locations to provide extra support for the stack of containers. For example, one or more elongated support members may be employed as cross-members that do not define the perimeter but are positioned to further support the stack of containers, for example at an interface between at least two of the containers in a bottommost row of the stack. There should be a sufficient number of elongated support members to adequately support the stack of containers and to adequately define the ventilation duct. The ventilation duct comprises a volume defined by the sides, top and bottom of the pallet. The top of the pallet comprises at least one aperture to permit air flow therethrough.

The low pressure plenum is in fluid communication and sealingly engaged with the ventilation duct. The seal may be provided in any suitable manner, for example by a gasket, an adhesive or simply a tight tolerance between a surface of the pallet and a surface of the plenum. A gasket (one or more) is preferred to both reduce manufacturing costs and to maintain modularity of the apparatus. Gaskets may comprise any suitable material that can form an air seal between the pallet and the surface of the plenum, for example foam, rubber and the like. Preferably, the low pressure plenum is in fluid communication with one of the sides or the bottom of the ventilation duct. When the plenum is in fluid communication with one of the sides, the bottom and the other sides are closed. The sides may be closed with elongated support members or a blocking member, although when a row of apparatuses are used in an installation, only the pallet at the end of the row needs to have all three remaining sides closed as the pallets in the middle of the row would be in fluid communication with the pallets on either side. The bottom of the pallet may be closed with a blocking member, but is more conveniently closed by a surface on which the pallet is resting, e.g. the floor of an installation. The interface between the bottom of the pallet and the surface on which the pallet rests may also be sealed if desired, for example with a gasket or a sufficiently tight tolerance between the elongated support members and the surface on which the pallet rests. Sealing the interface between the bottom of the pallet and the surface on which the pallet rests is not as important because the low pressure plenum is not usually unduly affected by such a lack of seal unless there is a large gap.

The low pressure plenum may comprise a confined space in fluid communication with the ventilation duct. Any suitable air flow device may be used to create low pressure in the plenum, for example air pumps or fans. A low pressure, i.e. a partial vacuum, may be formed in the low pressure plenum by drawing air out of the plenum with the air flow device. A fan equipped with a variable speed motor is particularly preferred. The moving air creates a pressure drop between the ventilation duct and the plenum, which draws air out of the ventilation duct into the plenum. The apparatus preferably comprise only one low pressure plenum.

A vertical stack of foodstuff holding containers may be supported on the pallet. The stack of containers has sides, a bottom and a top, the sides of the stack being sealed against air flow while the top and bottom of the stack are open to air flow. The sides of the stack may be sealed by using containers that have a solid surface on one side and ensuring that these solid-sides of these solid-sided containers are exterior facing. The sides of the stack could also be sealed by a sealing panel sealingly engaged with the sides, or even by a wall of the installation sealingly engaged with the sides. The sides of the stack could also be sealed by wrapping the stack in thin plastic sealing wrap. Any suitable means may be used to seal the sides of the stack so that vertical airflow is maintained in the stack. Thus, the low pressure plenum draws air vertically down through the top of the stack through the containers through the bottom of the stack into the ventilation duct and out of the ventilation duct into the plenum.

The stack may comprise one or more rows of containers and there may be one or more containers per row. The stack may simply rest on the pallet or may be sealingly supported on the pallet to prevent air from leaking out at an interface between the stack and the pallet. Sealing may be accomplished in a similar manner as described above for the plenum and ventilation duct. The bottommost row of containers in the stack may be sealingly supported on the pallet. Each row in the stack may have substantially the same arrangement and perimeter as neighboring rows in the stack. The arrangement and perimeter of the rows may be configured to conform to the perimeter of the pallet. The containers in a row may be arranged so that a side of each container abuts a side of another container in the row. Preferably, there are no large gaps between the containers in a row. Thus, the vertical stack may comprise a plurality of stacked rows of containers, each row of containers comprising a plurality of containers arranged so that a side of each container abuts a side of another container in the row, each row configured to have a substantially the same arrangement and perimeter as a neighboring row in the stack, whereby a bottommost row is sealingly supported on the perimeter of the pallet.

The construction of the container may be important to provide uniform drying of the foodstuffs in the container. The containers, for example baskets, boxes, buckets, etc., comprise apertures in bottoms thereof configured to permit air flow at least from above the containers through the bottom of the containers. The containers may also comprise sides and the sides of the containers may also comprise apertures. The tops of the containers are preferably open, or at least comprise a large aperture in relation to an area of the top. Container size may also play a role in efficient drying of foodstuffs. Containers having a bottom area in a range of from about 60,000 mm$^2$ to about 1,200,000 mm$^2$ or about 60,000 mm$^2$ to about 540,000 mm$^2$ (e.g. about 300-1200 mm or about 300-900 mm in length and about 200-1000 mm or about 200-600 mm in width) are generally suitable. Bottom areas in a range of about 150,000 mm$^2$ to about 350,000 mm$^2$ (e.g. about 500-700 mm in length and about 300-500 mm in width) may be preferred in some instances. The depth of the containers may be conveniently about 50-400 mm or about 50-200 mm, for example about 100-140 mm. The containers may be disposable or reusable, although reusable containers help reduce cost and have less environmental impact. The containers may be constructed of any suitable material, for example plastic, metal (e.g. stainless steel) or wood. Plastic containers are preferred as they are lighter, more easily sanitized and are less likely to impart foreign tastes to the foodstuffs.

There may be any number of rows of containers, but the most efficient number of rows of containers may depend to some extent on the depth of the containers, to some extent on the air-drawing capacity of the plenum and to some extent on the physical requirements of the installation in which the apparatus is used. It is desirable for a height of the stack to be short enough to provide easy access even to a topmost row of containers and to permit a uniform distribution of vertical air flow from the top of the stack to the bottom of the stack providing consistent conditions of temperature, relative humidity and air flow at all locations in the stack. The height of the stack and the air flow rate through the stack should be balanced to provide uniform drying throughout the stack. Given the container depth ranges described above, there are preferably about 5-25 rows, or about 10-20 rows, for example 15 rows, in the stack.

There may be one or more containers in a row, but the most efficient number of rows of containers may depend to some extent on the bottom area of the containers, the size of the pallet and the desired arrangement of containers in the row. For the container dimensions described above, each row may contain from 1 to 8 containers or 2 to 8 containers, preferably 4 to 6 containers, for example 5 containers.

Drawing air vertically through the stack of containers from the top to the bottom is an important feature. To efficiently and uniformly dry the foodstuffs in the containers in the stack, a uniform distribution of air flow past the foodstuffs is desired. Drawing air as opposed to pushing air reduces or eliminated dynamic pressure differences in the stack. Pushing air through the stack causes dynamic pressure wherever the air flows resulting in uneven drying of the food stuffs. Drawing air through the stack results in more uniform drying.

The installation for drying foodstuffs comprises a climate controlled room and an apparatus as described above situated in the climate controlled room. The room may be a room in a larger building, or may be a building unto itself. Climate in the room may comprise one or more of temperature and/or relative humidity. Temperature control may be accomplished in any suitable manner, for example with the use of one or more air conditioners, heaters, and the like. Combinations of temperature control devices may be used. Thermostats or other automatic temperature regulation devices may be used to automatically control the temperature in the room to within a predetermined tolerance. Relative humidity in the room may be controlled with any suitable device, for example, air conditioners, dehumidifiers and the like. Combinations of humidity control devices may be used. Humidistats or other automatic humidity regulation devices may be used to automatically control the humidity in the room to within a predetermined tolerance. Temperature and humidity measurement and control devices may be in communication with an electronic control system, for example a computerized system, to collect climate information and to adjust the climate control devices as needed to maintain a desired climate in the room.

Although the installation may comprise only one apparatus, it is preferable for the installation to comprise a plurality of apparatuses. Each apparatus may comprise a dedicated low pressure plenum. Alternatively, one low pressure plenum may be provided for two or more of the apparatuses, such an arrangement reducing overall installation and operation costs. In an embodiment, one low pressure plenum may be provided for all of the apparatuses. The plenum may comprise a single confined space longer than the length or width of the pallet and the stack of containers thereon, the confined space having a plurality of openings for interfacing with the ventilation ducts of pallets. Each of the openings may be interfaced with the ventilation duct of a pallet, or if not all of the available openings need to be used, unused openings in the plenum may be sealingly blocked with a cover. Sealing may be accomplished in a similar manner as described above for the plenum and ventilation duct.

Further, the installation may comprise one or more rows of apparatuses, the ventilation duct of each pallet interfaced with the ventilation duct of at least one neighboring pallet in the row. The row can be any length and there may be any number of pallets and stacks of containers thereon in a row. Thus, the ventilation duct of one of the apparatuses in the row is in fluid communication with the low pressure plenum, and the ventilation ducts of the other apparatuses in the row are sealingly engaged and in fluid communication with the ventilation duct of a neighboring apparatus in the row. Sealing may be accomplished in a similar manner as described above for the plenum and ventilation duct. The ventilation ducts in the pallets between the plenum and a last pallet in the row would be open on opposed sides (or one side and the bottom in an embodiment where the low pressure plenum is below the first pallet) and the ventilation duct of the last pallet would be closed on the bottom and all sides except the side in fluid communication with the neighboring ventilation duct.

The number of apparatuses in a row making use of a single low pressure plenum may depend on the strength of the low pressure plenum. As the row gets longer, the ability of the plenum to draw air through the last apparatus in the row is reduced. Further, apparatuses on a row that are situated further from the plenum may experience less air flow therethrough than those closer to the plenum. Therefore, there may be a limit to the number of apparatuses in a row. Rows containing from 1 to 4 apparatuses (i.e. 1 to 4 pallets with corresponding containers stacked thereon) are preferred.

In one embodiment, the installation may comprise a low pressure plenum situated beneath the floor of the room and running a length (or width) of the room. The plenum may be located at one wall of the room. The pallets may be placed over apertures in the floor above the plenum, the apertures sized so that the bottom of the pallet may be sealed on the floor of the room. Air may thus be drawn down through the bottom of the ventilation duct of the pallet. One side of the pallet may be sealed against the wall of the installation, and the other sides of the ventilation duct sealed with longitudinal support members or a blocking member, or a blocking member on the last pallet if a row of apparatuses is used. This embodiment is particularly suited for repurposing existing facilities, for example tobacco drying kilns.

Corridors may be provided between rows of apparatuses in the installation. Corridors permit access to all of the apparatuses in a row to enable inspection and sampling of the foodstuffs and servicing of the apparatuses. Alternatively or in addition, various sensors and/or cameras may be installed in the installation to provide real time information about the status of the apparatuses and the foodstuffs drying therein. Foodstuffs may thus be harvested directly in the apparatus as the containers may never need to be removed from the pallet throughout the drying process.

The method of drying foodstuffs comprises providing the foodstuffs in a plurality of the containers in the installation as defined above, controlling temperature, relative humidity or both temperature and relative humidity of air in the room, and drawing the air in the room vertically down past the foodstuffs until the foodstuffs are dried. The temperature may be controlled to any desired temperature and will depend on the type of foodstuff being dried. A temperature is in a range of from 2-20° C. is generally suitable. A temperature in a range of from 3-15° C., especially 5-10° C., is particularly suitable for drying grapes in the Appassimento style. Maintaining a constant temperature is usually desirable, but for some applications providing a temperature gradient over time may be suitable. Relative humidity also may depend on the foodstuff being dried. A relative humidity in a range of from 40-90% is generally suitable. A relative humidity in a range of from 60-80%, especially 65-75%, is particularly suitable for drying grapes in the Appassimento style. The air flow rate through the stack should be balanced with the height of the stack to provide uniform drying throughout the stack. The air flow rate may be in a range of 0.1-2 L/kg/s, or 0.2-1 L/kg/s. Where a fan is used to provide low pressure in the plenum, the air flow rate through the stack may be controlled by controlling the speed of the fan. Other air flow rate controllers known in the art may be used.

The time required to dry the foodstuff to the desired level is highly dependent on the particular foodstuff being dried. It is generally an advantage that the drying time for a particular foodstuff may be shorter while maintaining quality and consistency of the foodstuffs. When the foodstuff comprises berries, for example grapes, useful in the wine industry, the berries are generally dried until a certain ° Brix level is achieved. Total soluble solid (TSS) is the sugar content of an aqueous solution and is expressed as degrees Brix (° Bx). One degree Brix is 1 gram of sucrose in 100 grams of solution and represents the strength of the solution as percentage by weight (% w/w). Grapes generally start at a ° Brix level in a range of about 19-23° Brix, and the target for the drying process is usually at least 25° Brix, preferably 25-30° Brix, for example 28° Brix. For berries, e.g. grapes, the time to reach this level may be less than 120 days, for example from 7-115 days. This represents a significant shortening in time in comparison to traditional Appassimento drying methods. One advantage of the present process is to be able to customize and adjust the drying process, so shorter or longer drying times than the traditional 100 days may be used depending on the desired end result.

Exemplary foodstuffs that may be dried include fruit (e.g. berries, apples, oranges), vegetables (e.g. carrots), tubers (e.g. potatoes) and herbs (e.g. ginseng). The present invention is particularly useful for drying berries (e.g. grapes, strawberries, raspberries, blue berries, cherries), especially grapes.

In another aspect, the present invention may be used to process foodstuffs in a manner other than for drying. Thus, instead of or in addition to drying the foodstuff, the foodstuff may be otherwise processed, for example cured, cooled or treated with gas/fumigant. In one embodiment, a foodstuff (e.g. sweet potatoes) may be cured at high heat (e.g. 29° C.) and high humidity (85-95%) in an apparatus or installation of the present invention to cure the skin of the sweet potatoes to prevent moisture loss.

The present invention may provide one or more advantages. For example, the apparatus is very modular and can be adapted to large or small operations and is adaptable to different harvest conditions and winery requirements. The modularity also permits adaptation to existing facilities, for example tobacco drying kilns, thereby potentially reducing capital and start-up costs. The drying process is controllable and adjustable leading to more consistent product from year to year. Mold development is controllable thereby reducing crop loss due to mold. Drying times of the foodstuffs may be quicker, which is useful especially in the wine industry where vintners may be able to harvest earlier to avoid inclement weather or climatic conditions and still get consistency and quality. Grapes are dried uniformly and efficiently in the Appassimento style, without comprising the grapes' final quality, allowing for consistent production of a premium value-added wine independent of meteorological conditions. Further, the taste of wines produced from berries dried in accordance with the present invention may be improved, in part because spiders, earwigs and lady bugs may be largely eliminated from the berries before the berries are crushed. It has been surprisingly found that spiders, earwigs and lady bugs would migrate out of the berries during the drying. Furthermore, bottle yields may be as high as or higher than 500 bottles of Appassimento wine per ton of grapes with a drying cost as low as $1 CDN per bottle, making the production of such wines affordable. Labor costs are also reduced because less manual labor is required to dry the foodstuffs.

Further features will be described or will become apparent in the course of the following detailed description.

BRIEF DESCRIPTION OF THE DRAWINGS

For clearer understanding, preferred embodiments will now be described in detail by way of example, with reference to the accompanying drawings, in which:

FIG. 1A depicts a schematic of a side view of a drying apparatus comprising a vertical stack of reusable plastic grape holding baskets supported on a pallet in fluid communication with a low pressure plenum adjacent to the pallet;

FIG. 1B depicts FIG. 1A with sides of the stack sealed against air flow into the stack through the sides of the baskets;

DETAILED DESCRIPTION

Figure 1C:
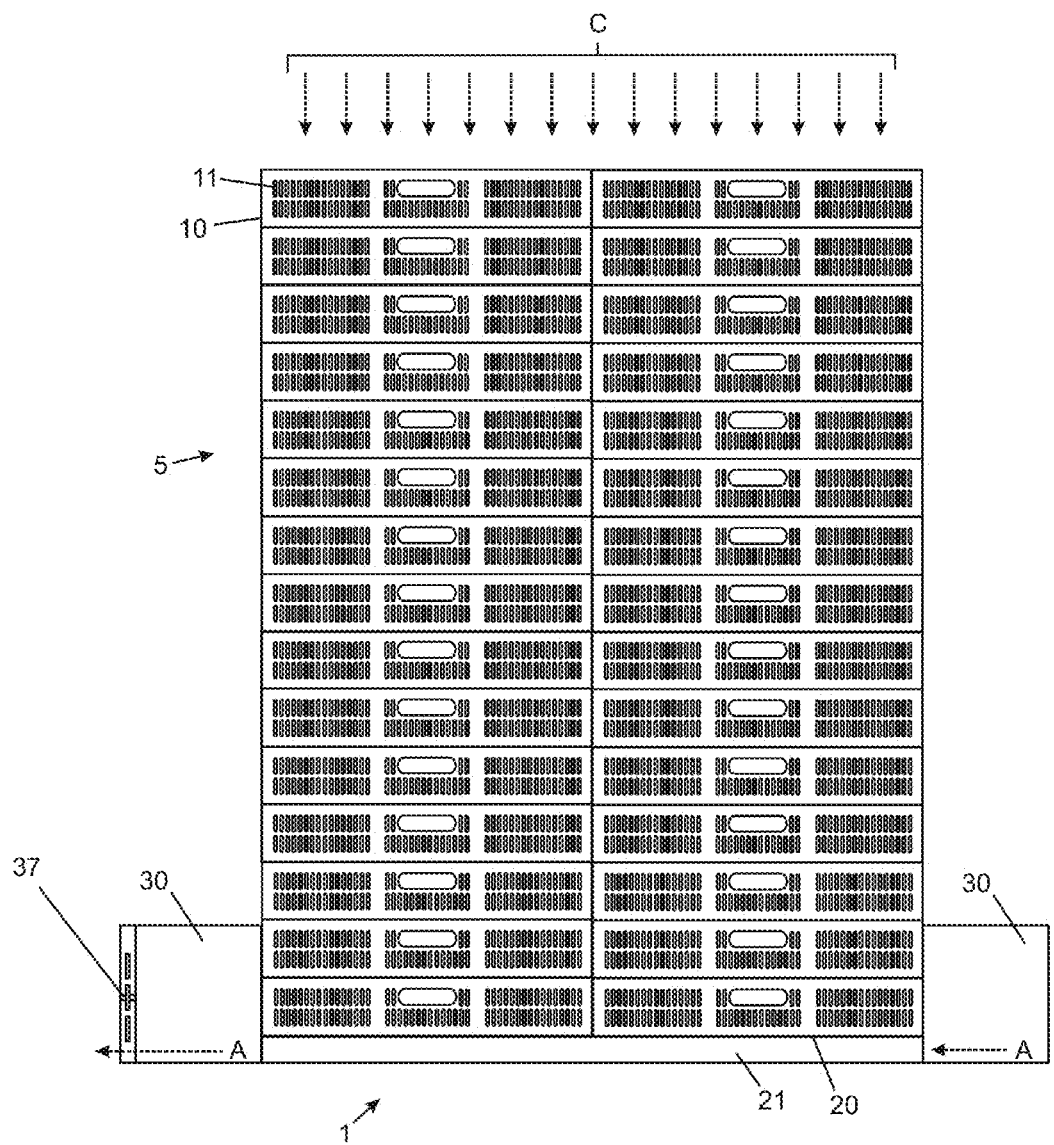
FIG. 1C depicts a front view of FIG. 1A.
Figure 1E:
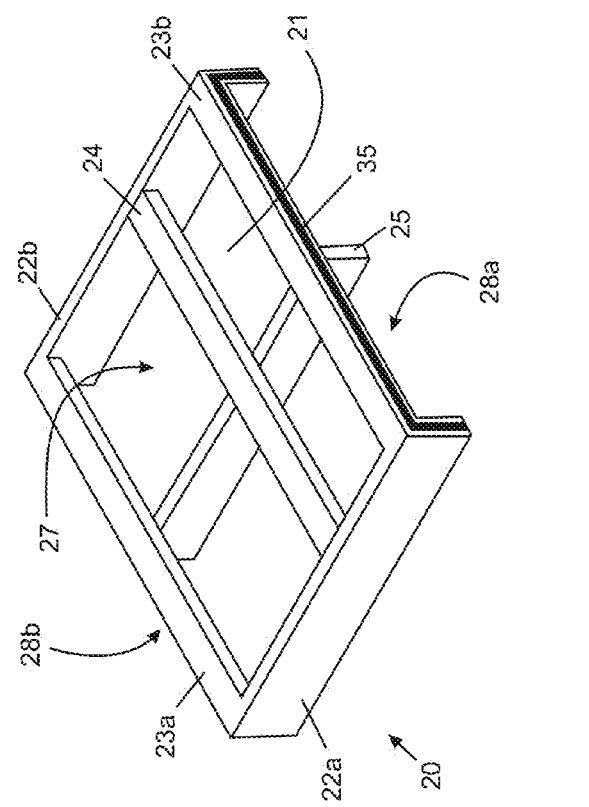
FIG. 1E depicts a pallet used in the drying apparatus of FIG. 1A.
Figure 1F:
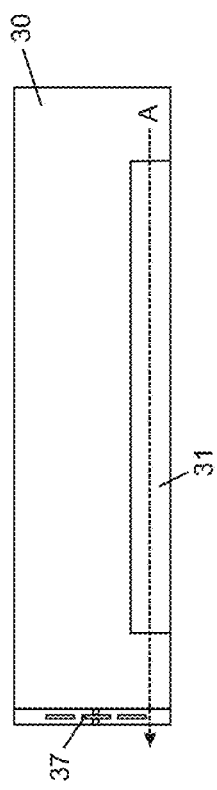
FIG. 1F depicts a front view of the low pressure plenum of FIG. 1A.
Figure 1D:
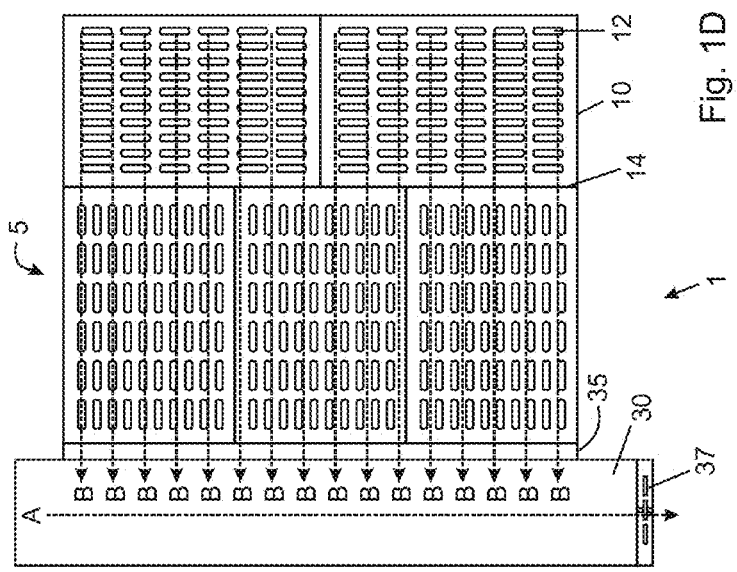
FIG. 1D depicts a top view of FIG. 1A.

Apparatus:

FIG. 1A, FIG. 1B, FIG. 1C, FIG. 1D, FIG. 1E and FIG. 1F depict one embodiment of a drying apparatus 1 comprising a vertical stack 5 of fifteen rows of grape holding baskets 10 (only one labeled). As best seen in FIG. 1D, there are five baskets 10 per row of baskets in the stack 5. The baskets 10 comprise a plurality of side wall apertures 11 (only one labeled) and bottom apertures 12. Each basket 10 has an open top. The baskets 10 are configured to nest on top of each other and sized to provide a rectangular cluster of five baskets when arranged as shown in FIG. 1D. The stack 5 is supported from beneath by a pallet 20. Details of the pallet are shown in FIG. 1E. A ventilation duct 21 defined by the pallet 20 is in fluid communication with a low pressure plenum 30 situated beside the pallet 20. The plenum 30 comprises a plenum aperture 31 (see FIG. 1F) and a foam sealing gasket 35 provides an air seal between the pallet 20 and the plenum 30 where the ventilation duct 21 and the plenum aperture 31 interface. The plenum 30 is provided with a variable speed fan 37 at one end, which draws air down the length of the plenum 30 past the plenum aperture 31 creating a drop in pressure in the plenum 30. Air flowing through the plenum 30 follows air flow path A as seen in FIG. 1C, FIG. 1D and FIG. 1F. It should be noted that the plenum 30 as depicted in FIG. 1C is behind the stack 5 since the plenum 30 runs alongside the pallet 20. It should also be noted that the plenum may be shorter and only as long as the side of the pallet if there is only one row of pallets in fluid communication with the plenum. As shown in FIG. 1B, the sides of the stack 5 are sealed against air flow by a blocking structure 7, which may be transparent to be able to view the baskets 10. Simply wrapping the sides of the entire stack 5 with a plastic film provides a suitable air seal.

As seen in FIG. 1E, the pallet 20 comprises two substantially parallel side boards 22a, 22b that form opposed sides of the pallet 20. Two substantially parallel top boards 23a, 23b connect the side boards 22a, 22b proximate ends of the side boards 22a, 22b. A cross-member board 24 parallel to and situated between the top boards 23a, 23b also connects the two side boards 22a, 22b to provide rigidity to the pallet 20. The cross-member board 24 is specifically located to align with an interface 14 (see FIG. 1D) between differently oriented baskets 10 in a row of the stack 5. A support board 25 parallel to the side boards 22a, 22b and beneath the top boards 23a, 23b and cross-member board 24 connect the top boards 23a, 23b to provide greater rigidity and stability to the pallet 20. The rectangular pallet 20 thus defines the ventilation duct 21 defined by the side boards 22a, 22b and top boards 23a, 23b, the ventilation duct 21 having an upper duct opening 27, two side duct openings 28a, 28b and an open bottom. The bottom may be sealingly closed by the floor, while one of the two side duct openings 28a, 28b may be sealingly closed by a blocking panel placed across the opening, or may be in fluid communication with a ventilation duct of a neighboring pallet. The other of the two side duct openings 28a, 28b is in fluid communication with the plenum aperture 31 of the low pressure plenum 30. The ends of the side boards 22a, 22b and the outside edges of the top boards 23a, 23b have foam sealing gaskets affixed thereto, one of the foam sealing gaskets being the sealing gasket 35 between the plenum 30 and the pallet 20, and the other providing a seal between the pallet 20 and a blocking panel or a neighbouring pallet. The top surfaces of the four boards 22a, 22b, 23a, 23b form a sealing support for the bottom of the stack 5 and define the upper duct opening 27, which is in fluid communication with the baskets 10 in the stack 5.

In operation, the fan 37 draws air through the plenum 30 along the air flow path A substantially parallel to the floor past the plenum aperture 31 thereby causing a pressure drop from the ventilation duct 21 to the plenum 30. Air thus moves out of the ventilation duct 21 into the plenum 30 along air flow path B substantially parallel to the floor and perpendicular to the height of the stack 5. Movement of air along path B in turn draws air down through the stack 5. Air from above the stack 5 is thus drawn down along air flow path C, through an open top of the stack 5, and through the bottom apertures 12 in the baskets 10. Air is permitted to diffuse between the baskets 10 due to the side wall apertures 11, but as shown in FIG. 1B, air is not permitted to be drawn in through the sides of the stack 5 due to the blocking structure 7 surrounding the sides of the stack 5. Sealing engagement of the bottom row of baskets 10 of the stack 5 with the top surfaces of the four boards 22a, 22b, 23a, 23b of the pallet 20 ensures that air is drawn vertically from the top of the stack 5 through the bottom of the stack 5 into the ventilation duct 21.

Figure 2:
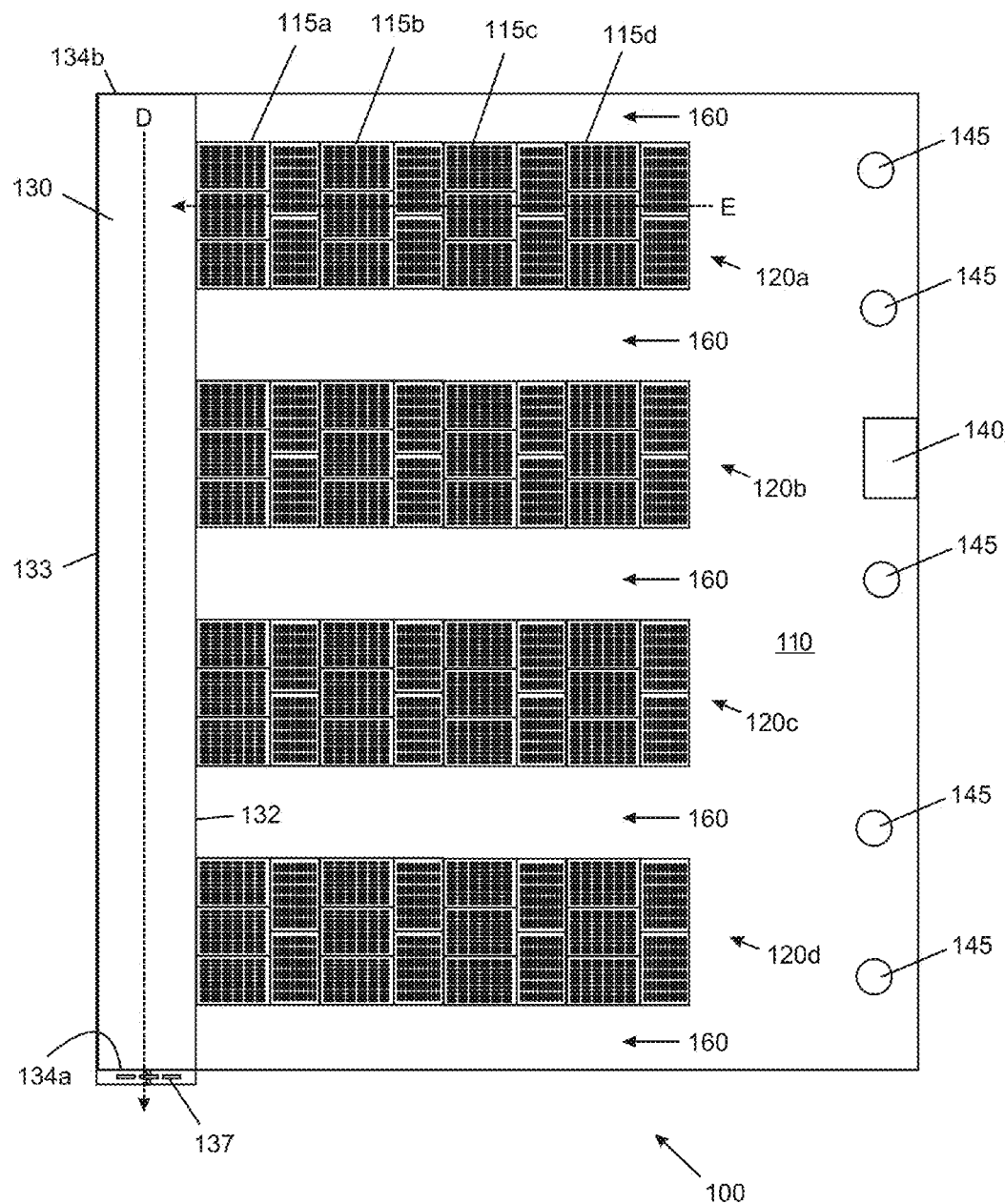
FIG. 2 depicts an installation comprising a plurality of rows of drying apparatuses, each row of apparatuses comprising a plurality of apparatuses in fluid communication with at least one neighboring apparatus, and each row of apparatuses in fluid communication with the same low pressure plenum.

Installation:

FIG. 2 depicts one embodiment of an installation 100 comprising a room 110 and four rows 120a, 120b, 120c, 120d of drying apparatuses in the room 110. Each row 120a, 120b, 120c, 120d comprises four apparatuses 115a, 115b, 115c, 115d (only the apparatuses in row 120a labeled) of fifteen vertically stacked rows of five baskets for holding foodstuffs (e.g. grapes). The drying apparatuses 115a, 115b, 115c, 115d are in fluid communication with at least one neighboring apparatuses. Each row 120a, 120b, 120c, 120d of apparatuses is in fluid communication with the same low pressure plenum 130. Air flow through the plenum 130 is provided by a variable speed fan 137 that draws air along air flow path D past plenum apertures spaced along an inside wall 132 of the plenum in the room 110. Air is drawn vertically down through each apparatus 115a, 115b, 115c, 115d as previously described and air flows through the ventilation ducts of each apparatus along air flow path E (only one labeled for row 120a). Opposing wall 133 and end walls 134a, 134b of the plenum 130 are formed by the walls of the room 110. A roof for the plenum 130 seals the top and air drawn by the fan 137 along air flow path D is eventually expelled through the fan 137 of the plenum 130. Thus, the plenum 130 is built into the room 110 using the floor and three walls 133, 134a, 134b of the room 110 as the bottom and three sides of the plenum 130. The roof and the inside wall 132 of the plenum 130 are additional building materials to complete the plenum 130. An air conditioner 140 cools the room 110 when required, and heaters 145 heat the room when required, the air conditioner 140 and heaters 145 controlling temperature and humidity in the room. Corridors 160 are provided adjacent the rows 120a, 120b, 120c, 120d for inspection, sampling and servicing the apparatuses.

Figure 3:
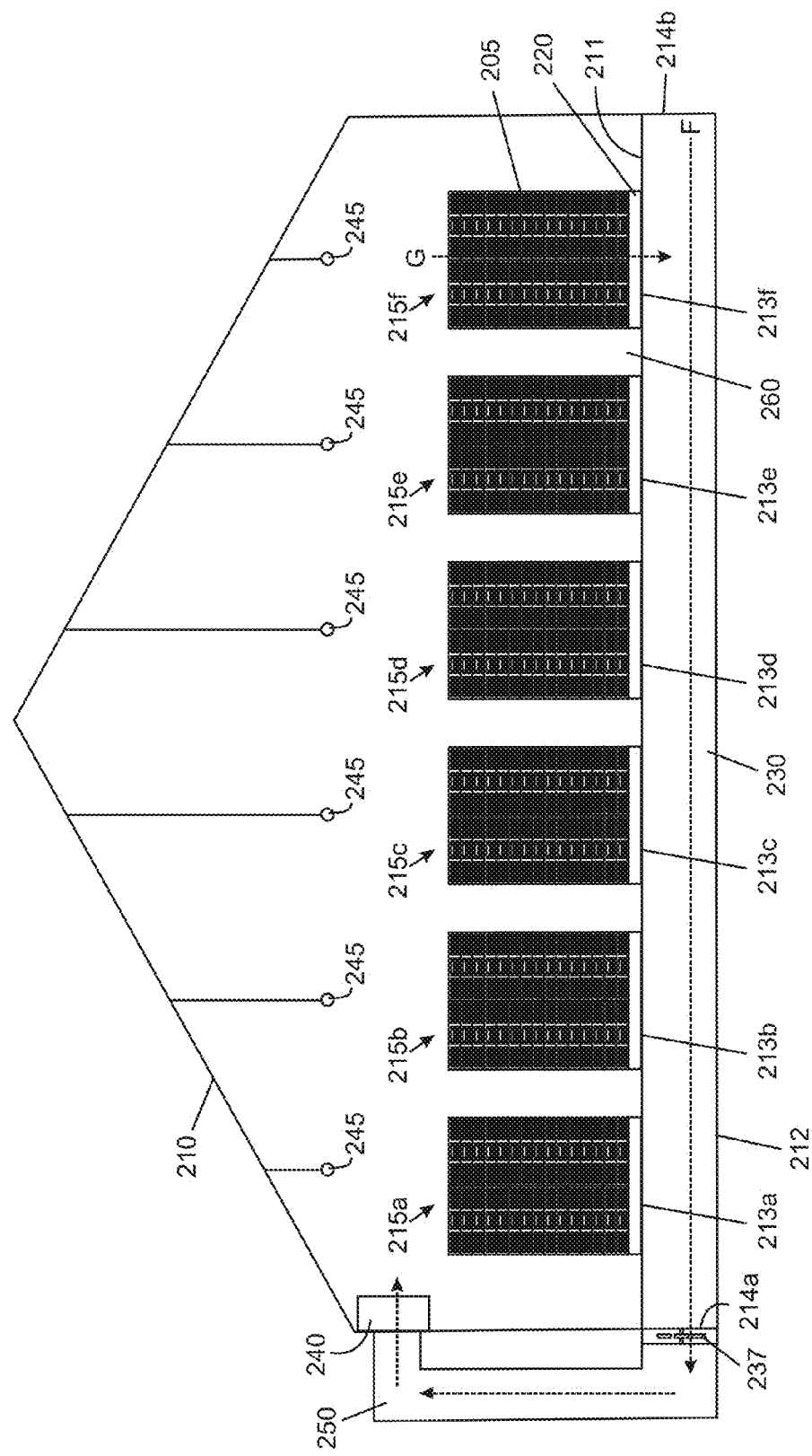
FIG. 3 depicts another embodiment of an installation comprising a plurality of apparatuses in fluid communication with a low pressure plenum below the apparatuses so that air flows out the bottom of the apparatus.

FIG. 3 depicts another embodiment of an installation 200 comprising a building 210, for example a tobacco kiln, retrofitted to house the installation. The building 210 comprises a subfloor 211 acting as a roof of a low pressure plenum 230. The subfloor 211 comprises a plurality of spaced-apart grates 213a, 213b, 213c, 213d, 213e, 213f over which a plurality of drying apparatuses 215a, 215b, 215c, 215d, 215e, 215f are situated. With reference to one of the drying apparatus 215f, each drying apparatus comprises a pallet 220 and a vertical stack 205 of baskets for holding foodstuffs (e.g. grapes). The bottom of the pallets 220 are in fluid communication with the low pressure plenum 230, the plenum 230 being defined by the subfloor 211, floor 212 and opposed walls 214a, 214b of the building 210. A fan 237 draws air along air flow path F underneath the grates 213a, 213b, 213c, 213d, 213e, 213f and out through the fan 237 in the wall 214a of the building 210. Air is drawn vertically down through the apparatuses 215a, 215b, 215c, 215d, 215e, 215f along air flow path G (only one labeled for apparatus 215f) directly through the grates 213a, 213b, 213c, 213d, 213e, 213f into the plenum 230. An air conditioner 240 cools the building 210 when required, and heaters 245 suspended from the ceiling of the building 210 heat the room when required, the air conditioner 240 and heaters 245 controlling temperature and humidity in the building. An air return conduit 250 located outside the building 210 permits air venting out from the fan 237 to be recirculated through the air conditioner 240 back into the building 210. Corridors 260 (only one labeled) are provided adjacent the apparatuses 215a, 215b, 215c, 215d, 215e, 215f for inspection, sampling and servicing the apparatuses. If there is sufficient room in the building, the apparatuses 215a, 215b, 215c, 215d, 215e, 215f may be replaced with rows of apparatuses.

Method:

The present method was applied to the drying of grapes, in particular for drying grapes to the standards of the wine industry. Specifically, the present method was adapted to the Appassimento drying method.

Experimental Design:

An installation comprising a cold room and an apparatus as described in connection with FIG. 1A-F was used to dry three varieties of grapes—Cabernet Franc, Cabernet Sauvignon and Merlot. The cold room was used to control the air temperature and humidity. The temperature was regulated by adding heat when required using heated lamps connected to a thermostat. The humidity was removed by condensing air on an evaporator surface of a cooling system and a humidistat was used to control the level of relative humidity. A stack of 15 containers containing the grapes (three varieties× five repetitions) was placed on the apparatus. The apparatus was composed of a variable speed fan used to create a pressure drop in a plenum located adjacent to a pallet at the bottom of the stack of containers, thus producing a vertical airflow movement from the top to bottom of the apparatus. To account for the experimental design, eight apparatuses were built and placed in four different cold rooms. The grapes were dried until the total soluble solids reached approximately 29° Brix.

The containers used to hold the grapes have an important role in the efficacy of the drying process. The container was a reusable plastic container (RPC), model IPL 6411, 600 mm long×400 mm large×120 mm high. These RPCs were designed to be easily folded, stacked, transported and sanitized. Their construction was ideal for the drying system as their openings were designed and optimized to allow air to circulate through and around a product when placed inside.

Grape varieties selected were Merlot, Cabernet Franc and Cabernet Sauvignon. These are the main varieties grown in the Niagara Peninsula region of Ontario, Canada, and the ones used most commonly for red wine production. These grapes were easily available and the varieties that would benefit most from an aroma improvement. The grapes were harvested in early September 2012 at a ° Brix level ranging from 21.7 to 22.6. The grapes were manually harvested and placed directly into the reusable plastic containers. The average mass of grapes in each container was 8±1.5 kg. After harvest the grapes were quickly placed in the drying installation with minimal handling, to begin the drying process.

Different drying parameters were tested using a full factorial design, with temperature, relative humidity, airflow rate and grape variety as factors, in order to determine the most favorable drying conditions with respect to the variety. The drying efficiency of each combination of factors was assessed by recording the grapes' total drying time, total weight loss and measuring the quality of the grapes through evaluating their chemical composition. The drying parameters were as follows: temperature of 10° C. and 5° C.; relative humidity (RH) of 75% and 65%; airflow rate of 0.4 L/kg/s and 0.25 L/kg/s; varieties were Cabernet Franc, Cabernet Sauvignon and Merlot. In total, there were a total of 24 combinations, each repeated five times.

Temperature and RH were monitored during the drying process. Weight loss and total soluble solids (TSS) as ° Brix were measured every two weeks. Grape quality analysis was conducted initially (at harvest), at approximately 25° Brix (mid-drying period) and at 29° Brix (final drying period). Grape quality analysis was performed to determine if the drying process affected the biochemical composition of the grapes. The grape quality analysis comprised the following evaluations: visual observation of mold, total soluble solids, pH, titratable acidity, acetic acid, malic acid, lactic acid, glycerol, glucose, fructose, ammonia nitrogen, primary amino nitrogen, ethanol, and acetaldehyde. Experiments were performed according to a factorial design. Data were analyzed using 4-way ANOVA with interactions, and the means were compared by the Tukey test at a significance level of 0.05 using the XLSTAT software (Addinsoft, France).

Weight loss and TSS values for the grapes were used to determine the kinetic drying rate and the time at which the experiment was to be completed, the objective being to attain 29° Brix. Weight loss was measured every two weeks for each of the 15 containers in each apparatus using a balance (OHAUStm, model Ranger v2 RC12LS, 12 kg capacity ±0.0005 kg). TSS was also measured every two weeks using 15 berries randomly sampled from each of the 15 containers, in each apparatus. Berries were manually crushed in a plastic bag and the juice used to determine the TSS value by means of a refractometer (Atago™, model PAL-1). Data are presented as weight loss per day (%/d), TSS per day (° Brix/d) and ratio of ° Brix per weight loss (B/WL).

Ten berries from each plastic container were selected randomly and crushed manually in a plastic bag and the juice was transferred to 15 mL centrifuge tubes. The tubes with juice were centrifuged (Sorvall ST 16 centrifuge, Thermo Scientific) at 5000 rpm for 15-20 minutes and the supernatant was transferred into 2 mL microcentrifuge tubes and stored at −20° C. for further chemical analysis. The remaining juice was used to measure pH (accumet AB15 Basic pH meter, Fisher Scientific) and titratable acidity (Metrohem autotitrator, model 848 Titrino Plus) by titration of 2 mL of juice diluted with 50 mL of water using 0.1 N NaOH to an endpoint of pH 8.2. Two readings were taken from each sample for total soluble solids and titratable acidity, and one reading was taken for pH.

Concentration measurements of 10 quality parameters were performed according to the manufacturer's specifications, using Megazyme™ assay kits and an absorbance microplate reader (BioTek™ Elx808) for samples at approximately 25° Brix (midpoint) and 29° Brix (final point). For the initial samples taken at harvest, the concentration of the 10 quality parameters was measured using a spectrophotometer (Smart Spec Plus™ from BioRad) and Megazyme assay kits, and carried out according to the manufacturer's specifications, with the modification of scaling down the volumes by half. The 10 quality parameters measured and Megazyme assay kits used to analyze their concentrations are listed in Table 1. For kits where the microplate assay protocol was not available, the assay volumes were scaled down 10 times in order to use the microplate reader. For determination of ethanol, malic acid and lactic acid, the samples were concentrated five times (i.e., instead of using 10 µL of sample, 50 µL was used, and the volume of water to which the sample was added was decreased by 40 µL to maintain the overall volume of solution). For determination of lactic acid the samples were concentrated 10 times using the same method. Triplicate analysis was performed on each sample and two data points were chosen for analysis for each sample.

TABLE 1

Kits utilized to determine concentration of 10 quality parameters

| Quality Parameter | Kit Name |
|---|---|
| Acetic Acid | Megazyme K-ACET |
| Malic Acid | Megazyme K-LMALR |
|  | Megazyme K-LMALL |
| Lactic Acid | Megazyme K-LATE |
| Glycerol | Megazyme K-GCROL |
| Glucose | Megazyme K-SUFRG |
| Fructose | Megazyme K-SUFRG |
| Ammonia Nitrogen | Megazyme K-AMIAR |
| Primary Amino Nitrogen | Megazyme K-PANOPA |
| Ethanol | Megazyme K-ETOH |
| Acetaldehyde | Megazyme K-ACHYD |

For the quality analysis, samples were grouped together according to the drying temperature (i.e., 5° C. and 10° C.) and ° Brix measurement at the point of chemical analysis (i.e., at approximately 25° Brix, mid-drying period (MP), and 29° Brix, final drying period (FP)). For each group, the average and standard deviation was calculated and graphed along with the data from the initial harvest samples for each variety.

Results:

Drying was concluded when the grapes attained the targeted ° Brix level, which was 29. The ° Brix level was monitored every two weeks by randomly selecting 10 berries from each container in order to determine the total soluble solids level.

Drying Time

Depending on the drying conditions and grape varieties, the time required to dry the grapes varied from 42 to 114 days (Table 2) and weight loss varied from 23% to 40% (Table 3). It is generally though that the Appassimento process should last up to 120 days with a weight loss of up to 40% in order to fully allow the grapes to develop the necessary specificities that will produce a premium wine. From the three varieties evaluated, Cabernet Sauvignon meets most of the Appassimento requirements when dried at the lower temperature and the higher RH. In order to establish the ideal Appassimento drying combination, with respect to the individual grape variety, it is important to follow the grapes beyond the drying process through to wine making. By creating wines from the grapes after the Appassimento drying it would be possible to determine the real relationship between these results and the development of flavors and aromas that contribute to the creation of a premium wine.

TABLE 2

Drying time in days (d) to reach the target ° Brix value

| | Drying time to reach 29° Brix (d) | | |
|---|---|---|---|
| Condition | Merlot | Cab. Franc | Cab. Sauv |
| 10° C.-65% RH | 47 | 42 | 65 |
| 10° C.-75% RH | 65 | 57 | 96 |
| 5° C.-65% RH | 60 | 58 | 110 |
| 5° C.-75% RH | 78 | 92 | 114 |

TABLE 3

Weight loss (%) over the total drying period

| | Total Weight Loss (%) at 29° Brix | | |
|---|---|---|---|
| Condition | Merlot | Cab. Franc | Cab. Sauv |
| 10° C.-65% RH | 29 | 23 | 32 |
| 10° C.-75% RH | 33 | 25 | 40 |
| 5° C.-65% RH | 28 | 24 | 42 |
| 5° C.-75% RH | 28 | 31 | 35 |

Based on visual observation mold development was considered negligible.

Drying Parameters

The overall effects of temperature, relative humidity and airflow on the drying kinetic of the three grape varieties are presented in Table 4. The drying kinetic is presented as the percent (%) of weight loss (WL) per day (d) and the ° Brix increase per day, as well as the ratio of ° Brix/weight loss (B/WL).

Temperature had a significant effect on the dependent variables. As temperature increased, WL and TSS increased as well. This response was expected, as higher temperature allows for a higher respiration rate and also created an increase in the partial water vapor pressure of the grapes. Correspondingly, the effect of relative humidity is also significant, as higher relative humidity conditions resulted in less WL and lower TSS values.

The airflow by itself did not represent a significant factor in the drying process. This may be a result of too small of a difference between the two airflow values tested or due to the water evaporation rate from the grapes being very small as compared to the air's capacity to absorb moisture.

The grape varieties did not respond the same way to drying, all three varieties being significantly different from each other. Merlot (M), due to the thin skin of its berries, had the higher rate of weight loss, followed by Cabernet Franc (CF) and finally Cabernet Sauvignon (CS) (Table 5). TSS values were also significantly different, with CF having the highest rate of ° Brix increase, followed by M and CS. One of the most important factors to consider during the drying process is the ratio of ° Brix increase per percentage of weight loss (B/WL). A higher B/WL value means that the percentage of weight loss that the grapes must achieve during drying in order to reach the targeted Brix level will be lower. A higher B/WL ratio results in a higher yield for the winery since the target ° Brix can be achieved with less overall weight loss occurring in the grapes. Cabernet Franc had the highest B/WL ratio, followed by M and CS, which means that CF is concentrating more sugar during the drying process for the same amount of WL, as compared to M and CS.

TABLE 4

Overall effects of temperature, RH and airflow rate on the drying kinetic

| | Weight loss (%/d) | TSS (° Brix/d) | Ratio (° Brix/WL) |
|---|---|---|---|
| Temperature (° C.) | | | |
| 10 | $0.504^a$ | $0.118^a$ | $0.236^a$ |
| 5 | $0.378^b$ | $0.085^b$ | $0.225^a$ |
| Relative Humidity (%) | | | |
| 65 | $0.487^a$ | $0.118^a$ | $0.242^a$ |
| 75 | $0.394^b$ | $0.086^b$ | $0.219^b$ |
| Airflow (L/min-kg) | | | |
| 0.25 | $0.445^a$ | $0.105^a$ | $0.234^a$ |
| 0.4 | $0.436^a$ | $0.098^a$ | $0.227^a$ |

For every independent variable, means with the same letters are not significantly different at alpha = 0.05.

TABLE 5

Effect of grape variety on the drying parameters

| Variety | Weight loss (%/d) | TSS (Brix/d) | Ratio (Brix/WL) |
|---|---|---|---|
| Cabernet Franc | $0.434^b$ | $0.127^a$ | $0.293^a$ |
| Merlot | $0.486^a$ | $0.106^b$ | $0.220^b$ |
| Cabernet Sauvignon | $0.403^c$ | $0.072^c$ | $0.178^c$ |

Means with the same letters are not significantly different at alpha = 0.05.

The interaction between temperature and weight loss and the resulting response from the different varieties was also significant (Table 6). At the higher temperature, Merlot was significantly more affected than the other varieties. At the lower temperature, the difference is less marked, however Merlot still has the higher rate, which is significantly different from Cabernet Sauvignon. As expected, the TSS increase rate was higher for Cabernet Franc at both temperatures but not significantly different from Merlot at low temperature. Cabernet Franc had the higher B/WL ratio at the higher temperature, significantly different than the other varieties but not different from what is observed for itself at low temperature. Correspondingly, similar results were observed for RH, with the exception that there was no significant difference between low and high RH for TSS development and B/WL values for CS, as well as B/WL values for M (Table 7). The two airflows were not significantly different in any of the cases but the response to airflow was significantly different between varieties, with M being the most affected through WL and CF for TSS and B/WL (Table 8).

TABLE 6

Interaction between temperature and weight loss

| Temperature (° C.) | Weight loss (%/d) | | |
|---|---|---|---|
| | Merlot | Cab. Franc | Cab. Sauv |
| 10 | $0.561^a$ | $0.491^b$ | $0.459^b$ |
| 5 | $0.410^c$ | $0.376^{cd}$ | $0.348^d$ |

| Temperature (° C.) | TSS (° Brix/d) | | |
|---|---|---|---|
| | Merlot | Cab. Franc | Cab. Sauv |
| 10 | $0.118^b$ | $0.152^a$ | $0.085^c$ |
| 5 | $0.095^c$ | $0.102^{bc}$ | $0.059^d$ |

| Temperature (° C.) | Ratio (° Brix/Weight loss) | | |
|---|---|---|---|
| | Merlot | Cab. Franc | Cab. Sauv |
| 10 | $0.209^{cd}$ | $0.315^a$ | $0.184^d$ |
| 5 | $0.231^{bc}$ | $0.270^{ab}$ | $0.173^d$ |

Means with the same letters are not significantly different at alpha = 0.05.

TABLE 7

Interaction between relative humidity and weight loss

| Relative Humidity | Weight loss (%/d) | | |
|---|---|---|---|
| | Merlot | Cab. Franc | Cab. Sauv |
| 65 | $0.536^a$ | $0.484^b$ | $0.442^{bc}$ |
| 75 | $0.435^c$ | $0.383^d$ | $0.365^d$ |

| Relative Humidity (%) | TSS (° Brix/d) | | |
|---|---|---|---|
| | Merlot | Cab. Franc | Cab. Sauv |
| 65 | $0.122^b$ | $0.150^a$ | $0.081^{de}$ |
| 75 | $0.090^{cd}$ | $0.104^{bc}$ | $0.063^e$ |

| Relative Humidity (%) | Ratio (° Brix/Weight loss) | | |
|---|---|---|---|
| | Merlot | Cab. Franc | Cab. Sauv |
| 65 | $0.230^{bc}$ | $0.316^a$ | $0.180^d$ |
| 75 | $0.210^{cd}$ | $0.269^b$ | $0.177^d$ |

Means with the same letters are not significantly different at alpha = 0.05.

Means with the same letters are not significantly different at alpha=0.05.

TABLE 8

Interaction between airflow and weight loss

| Airflow (L/min-kg) | Weight loss (%/d) | | |
|---|---|---|---|
| | Merlot | Cab. Franc | Cab. Sauv |
| 0.25 | $0.491^a$ | $0.438^b$ | $0.408^{bc}$ |
| 0.4 | $0.481^a$ | $0.430^{bc}$ | $0.399^c$ |

TABLE 8-continued

Interaction between airflow and weight loss

| Airflow (L/min-kg) | TSS (° Brix/d) | | |
|---|---|---|---|
| | Merlot | Cab. Franc | Cab. Sauv |
| 0.25 | $0.111^b$ | $0.129^a$ | $0.076^c$ |
| 0.4 | $0.101^b$ | $0.125^a$ | $0.068^c$ |

| Airflow (L/min-kg) | Ratio (° Brix/Weight loss) | | |
|---|---|---|---|
| | Merlot | Cab. Franc | Cab. Sauv |
| 0.25 | $0.228^b$ | $0.299^a$ | $0.187^{cd}$ |
| 0.4 | $0.212^{bc}$ | $0.286^a$ | $0.169^d$ |

Means with the same letters are not significantly different at alpha = 0.05.

Means with the same letters are not significantly different at alpha=0.05.

Titratable Acidity and pH

The acidity level of juice or wine is a very important factor which will affect the composition, color, microbial stability, chemical reactions, structure, and above all the sensory perception and taste of the wine. Acids can be divided into two groups: the fixed acids (predominantly tartaric, malic, citric, and succinic), and the volatile acids (almost exclusively acetic acid).

The perception of acidity is also influenced by the type of acid present in the wine, with malic acid having the greatest perceived sourness of all the wine acids. Acid thresholds are increased by the presence of ethanol and also by sugar. The overall sensory perception of acidity is a function of a balance between all of these influences. Acidity in wine can come from those acids which are already present in the grape at harvest, or from those which are generated during winemaking or drying.

Acidity in wine is typically measured as titratable acidity (TA); chemically the acids influence total titratable acidity and pH.

Titratable acidity in grapes usually is in the range of 5 to 16 g/L. The pH of grape juice is ideally in the range of 3.0 to 3.8 at harvest. Both TA and pH could be higher or lower depending on the climate where the grapes are grown. Grapes which are grown in cooler regions tend to ripen later and at harvest they typically yield juice with a lower pH and higher TA than grapes grown in warmer climates. Typical harvest parameters for Merlot, Cabernet Sauvignon and Cabernet Franc in the Niagara Peninsula are a pH between 3.3 to 3.5 and a TA between 5 to 7 g/L. In general, wines produced from a high ° Brix must, in the range of 23.0 to 26.0, are recommended to also have a must TA ranging from 5.0 to 7.5 g/L and a pH of 3.3 to 3.7.

Figure 4A:
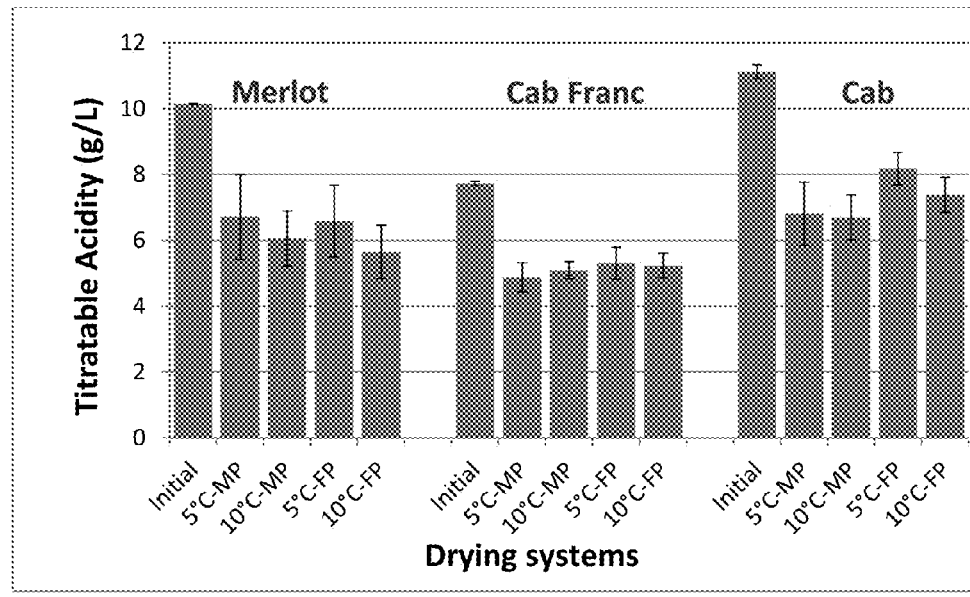
FIG. 4A depicts a graph showing titratable acidity for different drying conditions for three grape varieties.
Figure 4B:
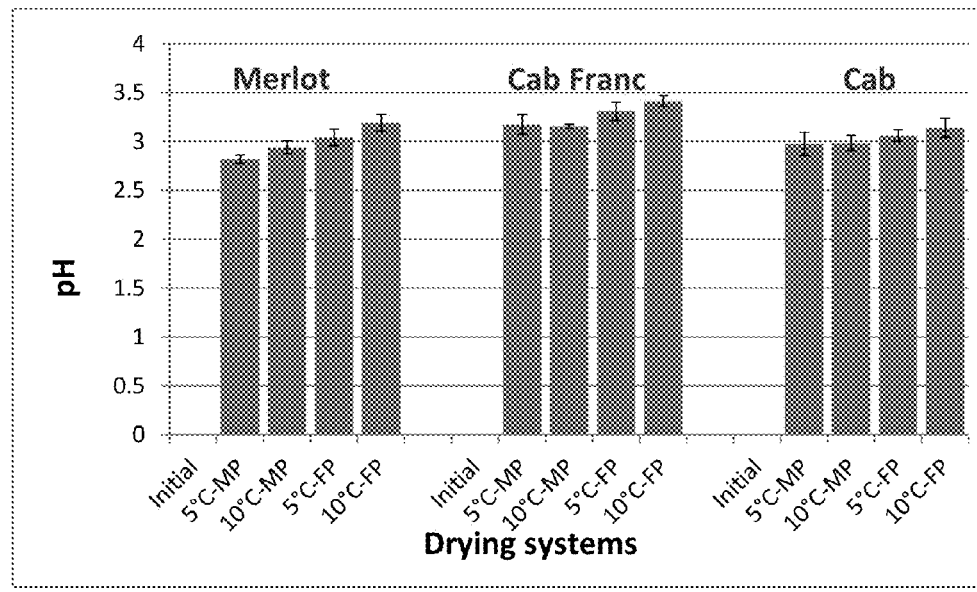
FIG. 4B depicts a graph of pH values for different drying conditions for three grape varieties.

In this study, the starting ranges of TA at harvest were consistent with the expected range of 5.0 to 16 g/L (FIG. 4A), with respect to the variety and typical values for the Niagara Peninsula region. Harvest values were on the higher end of the expected range, which is representative of a cool climate region, such as the Niagara Peninsula. The pH levels were lower than a typical harvest target value for the region but increased over the course of the drying process as TA declined (FIG. 4B). The results after drying were grapes with pH values very close to or within the ideal range for the region of 3.3 to 3.5. The decrease in TA and corresponding increase in pH during drying is likely a result of malic respiration, as malic acid is quickly consumed early in grape dehydration.

Malic Acid and Lactic Acid

At equal levels of each of the common wine acids, malic acid has the highest perceived sourness, followed by tartaric acid, citric acid and lactic acid. Malic acid is biologically fragile and is readily metabolized by numerous wine bacteria in the process of malolactic fermentation. During malolactic fermentation, bacteria in the wine convert malic acid to lactic acid. This malic acid decrease is greater in conditioned drying systems than what is seen in natural drying systems. For wines grown in a cool climate, the level of acidity may be too high at harvest, resulting in overly tart wines. In many wines, malolactic fermentation can function as an important deacidification process. The bacteria responsible for the malolactic conversion are also responsible for producing compounds which can contribute to complex aromas and cream and buttery characteristics in the wine. Malic acid is typically in the range of 2 to 4 g/L in grapes at harvest and may be as high as 6 g/L in grapes from a cold growing region. Lactic acid is usually found in concentrations of 0 to 2.5 g/L in wines.

Figure 5A:
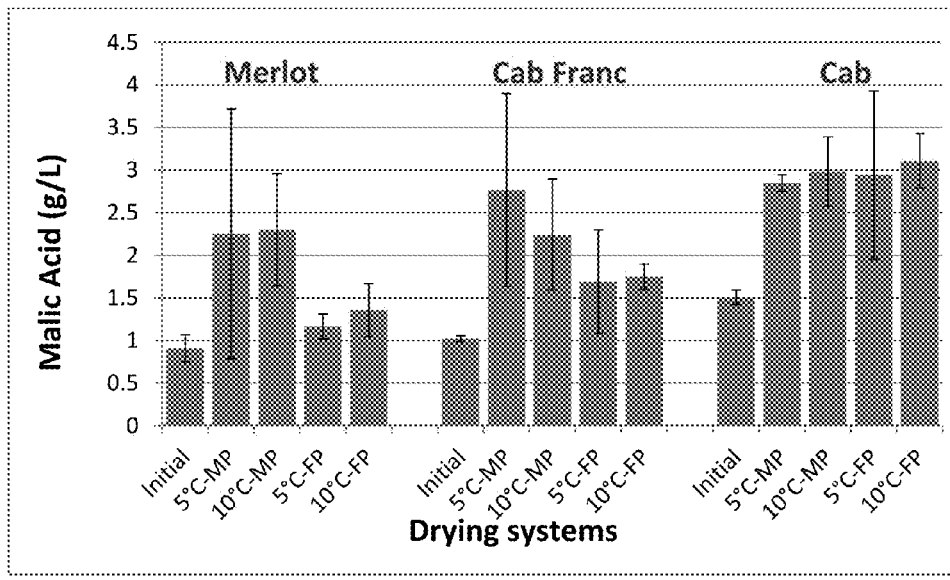
FIG. 5A depicts a graph of malic acid values for different drying conditions for three grape varieties.
Figure 5B:
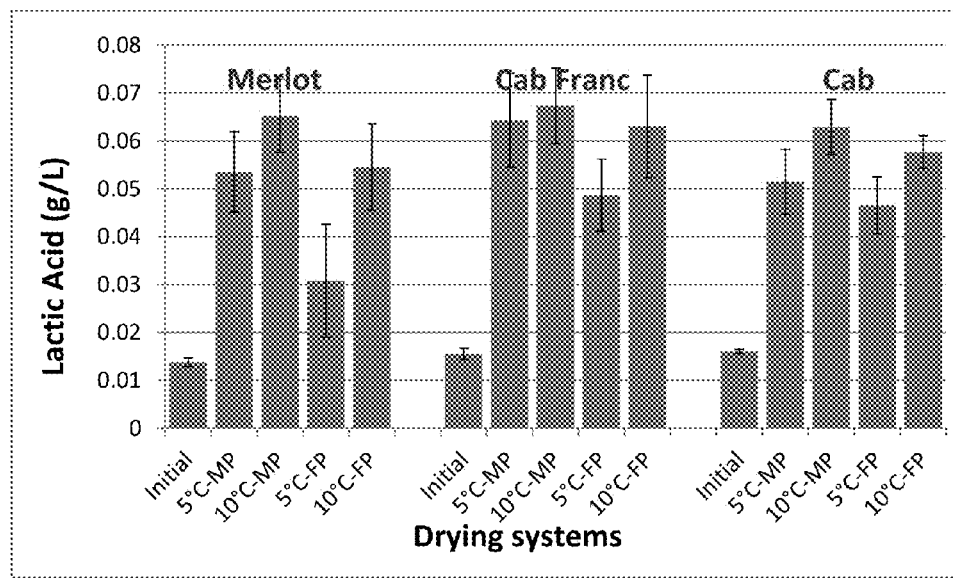
FIG. 5B depicts a graph of lactic acid values for different drying conditions for three grape varieties.

The low values reported herein for the initial concentration of malic acid and the subsequent increase seen at the mid-drying point suggests that there might have been an error in the reporting of the initial values (FIG. 5A). The levels at the mid-drying point are in the range of normal values for malic acid in grapes and these levels decrease over time by the final drying point, which is expected as malolactic fermentation occurs. Lactic acid in wines is produced mainly as a result of malolactic fermentation; however, lactic acid can also be produced using other sources besides malic acid by the microorganisms present, and thus malolactic fermentation is measured by the disappearance of malic acid, rather than by the increase of lactic acid. An increase in lactic acid concentration was observed between the initial very low harvest values and the higher mid-drying point values (FIG. 5B). There was an overall decrease in concentration of lactic acid by the final drying point, however this drop was minor. The literature suggests that once lactic acid is formed, the levels should not undergo much change.

Acetic Acid and Acetaldehyde

Volatile acidity in wines is most often viewed as a spoilage characteristic and includes compounds such as acetic acid, acetaldehyde and ethyl acetate, which generate undesirable sensory characteristics (e.g. aromas of vinegar, oxidized, or nail polish remover) at high concentrations. In certain botrytized wines these acids can sometimes contribute positively to the aroma and flavor characteristics. Levels of volatile acidity are usually monitored closely throughout the wine making process, as concentrations can easily increase due to microbial activity. Volatile acidity can be veiled by high levels of sugar and alcohol and also increases the sensory perception of tannins and fixed acids.

Acetic acid is a by-product of microbial metabolism through the process of wine making and it eventually becomes the main volatile acid in the finished wine with a typical concentration range of 200-400 mg/L. The production of acetic acid during fermentation is not well understood. It has a distinct odor and like other volatiles it evaporates quickly. The production of acetic acid will result in the formation of other undesirable compounds, such as acetaldehyde and ethyl acetate. Acetaldehyde is a major component in the production of ethanol and it is normally reduced during fermentation. In some instances it is still present in wine at concentrations of 20 to 200 mg/L but the threshold ranges from about 100 to 125 mg/L. Both acetic acid and acetaldehyde can have negative effects on fermentation, as they are toxic to the *Saccharomyces cerevisiae* yeast.

Figure 6A:
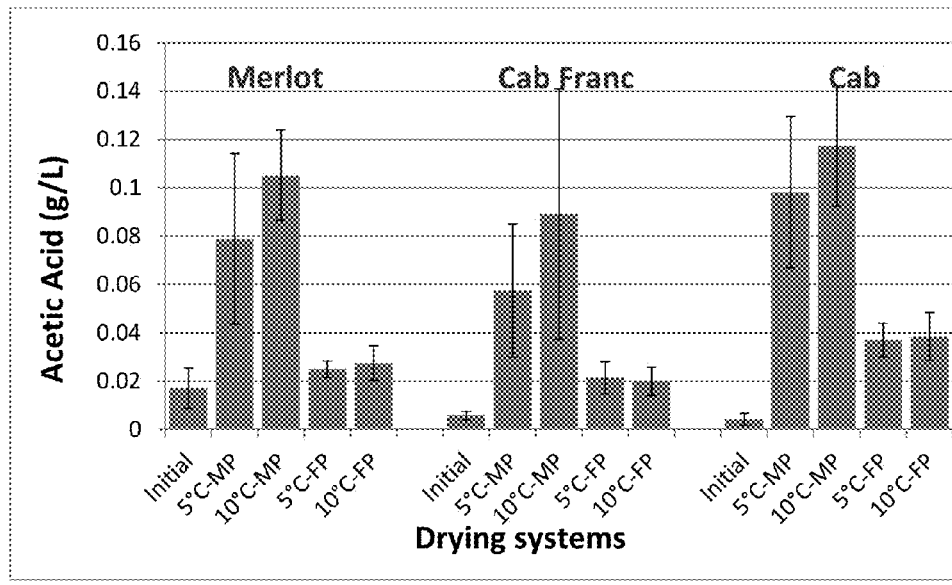
FIG. 6A depicts a graph of acetic acid values for different drying conditions for three grape varieties.
Figure 6B:
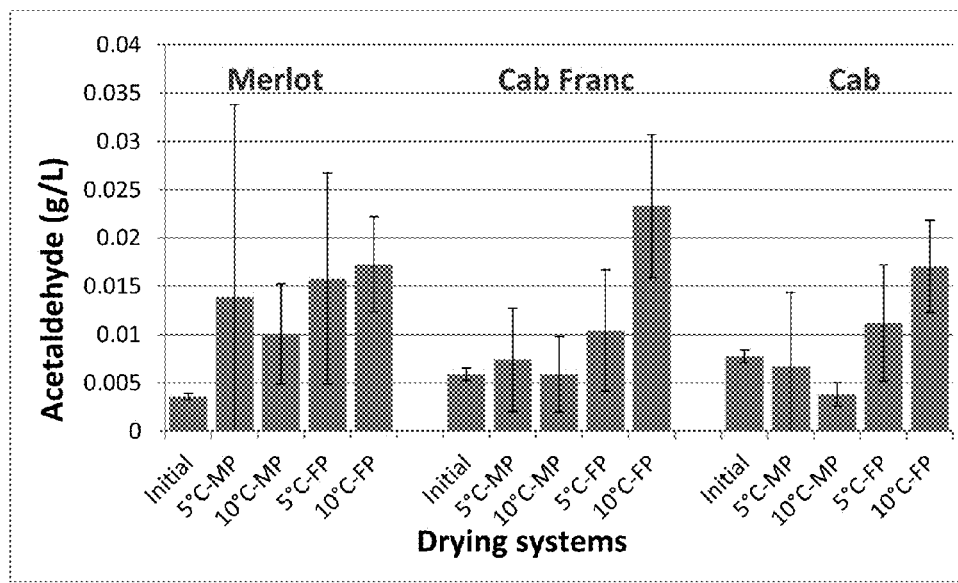
FIG. 6B depicts a graph of acetaldehyde values for different drying conditions for three grape varieties.

Results for the present method show an initial increase in acetic acid levels as a result of microbial activity and metabolic processes (FIG. 6A). This is followed by a decrease in levels; acetic acid is a volatile and evaporates quickly which could explain some of the decrease in concentration, especially at the higher temperature. Production of acetic acid during wine making also slows down at pH levels over 3.2 and the pH in the grapes was increasing to this level or close to this level as the drying progressed. Acetaldehyde levels will increase as acetic acid concentration increases, since it is a by-product of acetic acid production, and an increase in acetaldehyde was visible by the final drying point in all varieties (FIG. 6B). The threshold for acetaldehyde ranges from 100 to 125 mg/L and the final levels in this study are far below this concentration.

Glucose and Fructose

Glucose and fructose are the two major sugars in grapes and comprise the majority of the soluble solids. These sugars are fermented into alcohol by the yeast. Determining the ° Brix does not accurately represent the sugar content in grapes and a measurement of the glucose and fructose levels can help to determine the fermentability of a wine. Both fructose and glucose are partially responsible to impart sweetness to grape juice, and also to the wine if still present after fermentation.

In unripe berries, glucose is the predominant sugar. In ripe berries, the sugar content is usually between 150 to 250 g/L with variability based on the variety and a ratio of glucose to fructose concentration that is close to one (1:1); however, climatic conditions could affect the 1:1 ratio. Glucose is metabolized slightly faster by the yeast during wine making and consequently the ratio declines gradually during fermentation.

Figure 7A:
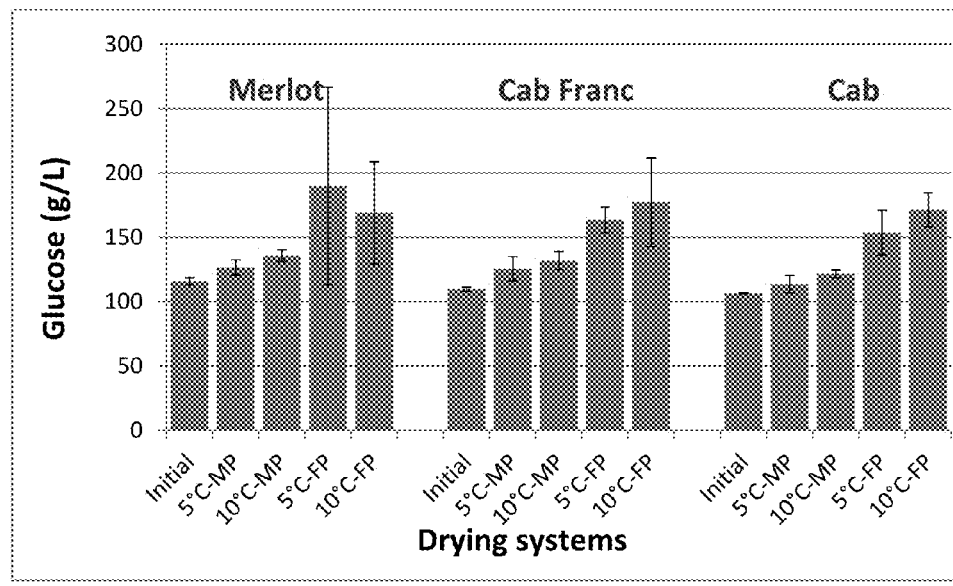
FIG. 7A depicts a graph of glucose values for different drying conditions for three grape varieties.
Figure 7B:
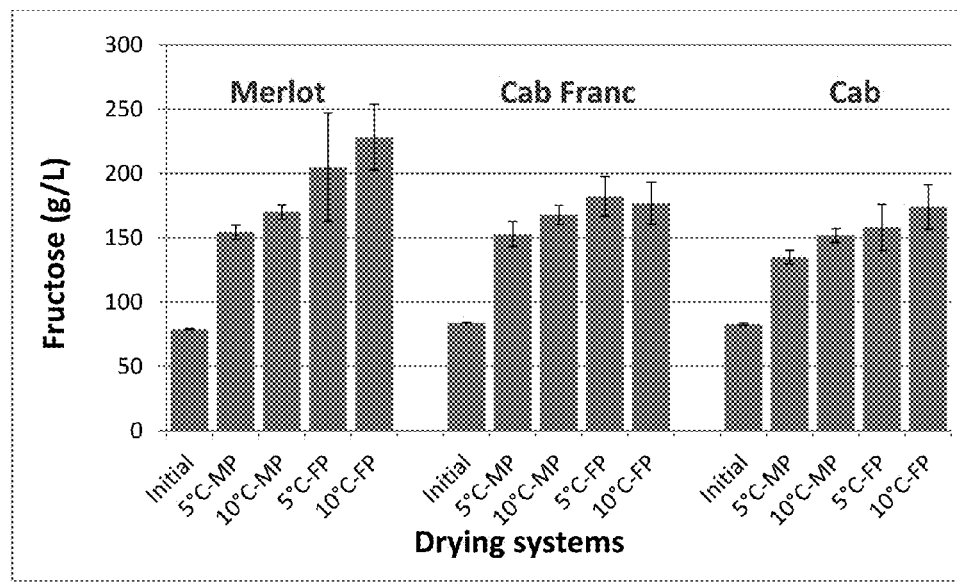
FIG. 7B depicts a graph of fructose values for different drying conditions for three grape varieties.

Results showed that the glucose to fructose ratio was close to the expected 1:1 level in the grapes at harvest in all varieties. Glucose was a bit higher in concentration than fructose, which is typical of grapes that are not completely ripe or those grown in cooler regions, and corresponds to the high initial TA levels seen (FIG. 7A and FIG. 7B). The initial combined sugar content for each variety was within the typical range of 150 to 250 g/L. Overall there was a concentration effect of the sugars during drying, which created an increase in sugar levels. At the same time that sugar was being concentrated through the drying process, sugar was also being metabolized, and glucose at a slightly faster rate than fructose. Accordingly, the data shows that although both sugars increased in concentration as the grapes lost water, the fructose concentration increased at a faster rate.

Ethanol

Figure 8:
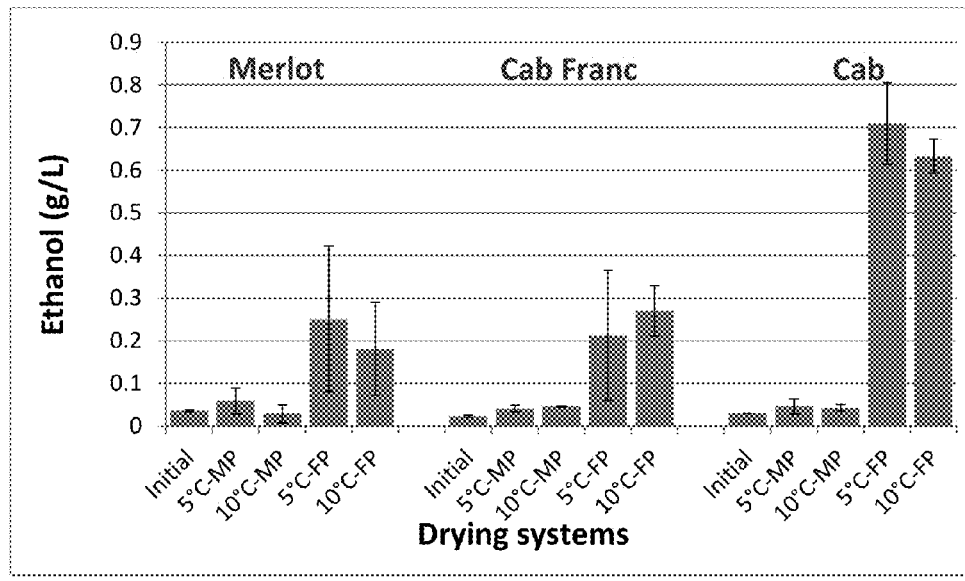
FIG. 8 depicts a graph of ethanol values for different drying conditions for three grape varieties.

Ethanol in wine is produced through alcoholic fermentation and it is the main by-product of this process. Ethanol affects the flavor of a wine and also the wine's body. Prior to fermentation, the level of ethanol is almost zero in grape juice. Ethanol content increases in both control and tunnel-dried grapes. The effect of ethanol concentration due to weight loss in dried grapes is partial. The increase in ethanol during the drying process is also due to metabolic processes. As expected, results show an increase in overall ethanol content due to metabolic processes (FIG. 8). In two of the three varieties, there is a slight drop in concentration at the final point for the higher temperature treatment. This could be due to the stress of the higher temperature and evaporative nature of ethanol.

Glycerol

Glycerol is an alcohol found in trace amounts in sound grapes, typically less than 1 g/L. It is produced as a by-product during sugar fermentation and is typically found in concentrations of 4 to 12 g/L in table wines, and can be as high as 15 to 25 g/L in late harvest wines. Glycerol is viscous and sweet, and the detectable sweetness level in wine is 5 g/L.

The general perception is that glycerol contributes positively to the quality of wine. It has been suggested to contribute specifically to the mouth-feel, body and texture properties of wine, although no positive relationship has been established between glycerol and mouth-feel. Glycerol content increases in tunnel-dried grapes by the end of the dehydration process to 1.5 g/L.

Figure 9:
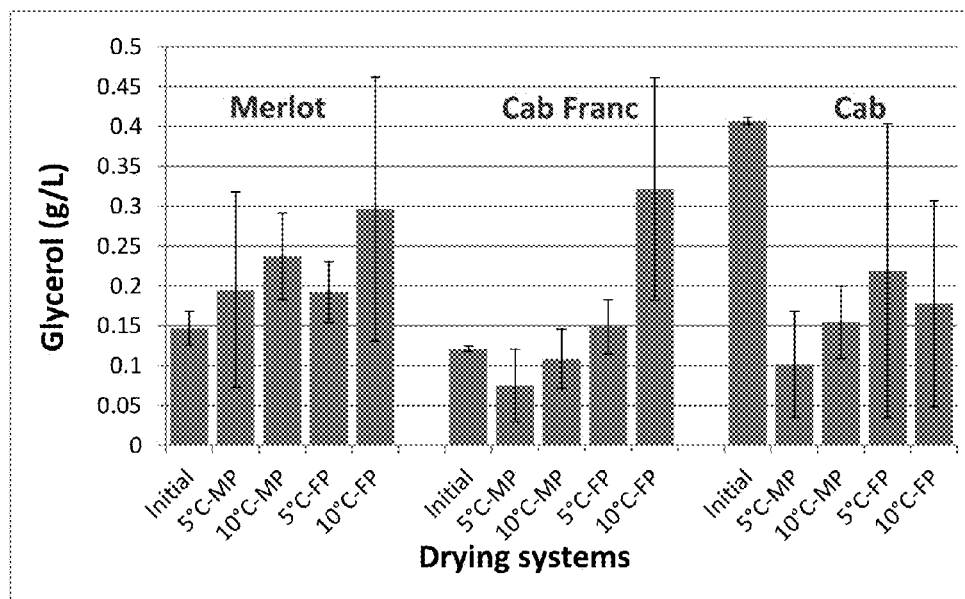
FIG. 9 depicts a graph of glycerol values for different drying conditions for three grape varieties.

Results in the present method showed initial glycerol levels to be in the typical range expected for grapes, less than 1 g/L (FIG. 9). In Merlot and Cabernet Franc there was an overall increase in levels by the end of the drying process, which is consistent with the prior art. In all varieties there was an increase in glycerol concentration from mid-drying point to final drying point at the higher temperature, and also at the lower temperature for CF and CS.

Ammonia Nitrogen and Primary Amino Nitrogen

Nitrogen is a very important compound in wine production, as it is a nutrient used by yeast in the fermentation process. Ammonia Nitrogen and Primary Amino Nitrogen together represent the total Yeast Assimilable Nitrogen (YAN), which is the total nitrogen available for yeast to use. A good fermentation process will result in good alcohol production. If there is a deficiency of nitrogen in the must, then fermentation will not proceed without problems, including stuck fermentation and the potential production of hydrogen sulfide, which has a rotten egg odor. Additionally, if there is too much protein present then there could be clarification issues with the wine.

Ammonia nitrogen is the primary form available for yeast to metabolize and is usually present in a range of 24 to 209 mg/L in grapes. Generally yeast need at least 150 mg/L for YAN requirements and 200 to 250 mg/L is preferred. As stress variables increase, the YAN concentration needed in the must will also increase. Stress factors include temperature extremes and high ° Brix.

Figure 10A:
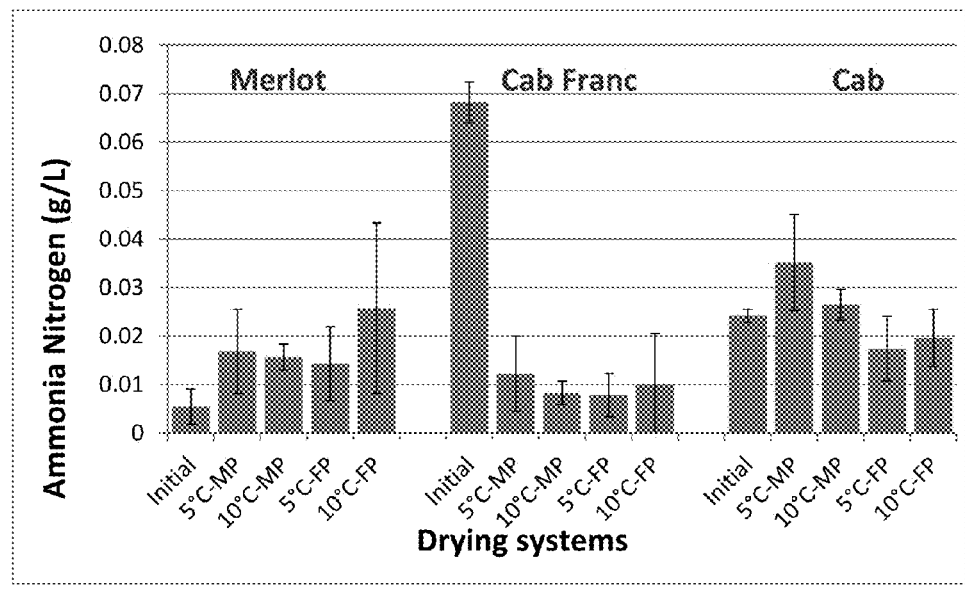
FIG. 10A depicts a graph of ammonia nitrogen values for different drying conditions for three grape varieties.
Figure 10B:
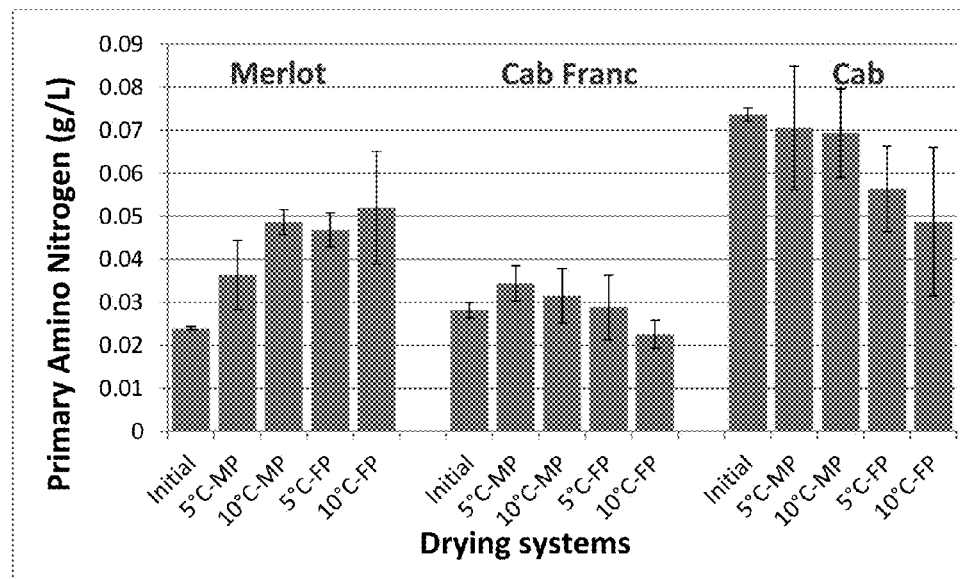
FIG. 10B depicts a graph of amino nitrogen values for different drying conditions for three grape varieties.

Results in the present method were highly variable between varieties. Overall there was likely a concentration effect occurring during the drying process, along with some metabolic activity (FIG. 10A and FIG. 10B). Initial levels were overall quite low in the grapes and the values at the end of the drying process were still low, however YAN requirements will vary depending on the winemaker and the specific wine being produced.

The most promising combination of drying parameters in terms of total Appassimento wine yield produced from the dried grapes, would be to use Cabernet Franc at a faster drying rate; in this case the best parameters were 10° C. and 65% RH. However, a faster drying time may be viewed as contrary to the spirit of the Italian Appassimento wine making process, since the hallmark flavors and aromas may not have adequate time to fully develop in a very fast drying process. A slower drying process would require a low temperature and a higher relative humidity; for this study the parameters to create a slower drying time were 5° C. and 75% relative humidity.

Results showed that the Appassimento drying principle is variety related. Cabernet Sauvignon was naturally a slower drying variety than Cabernet Franc and Merlot, for the particular harvest year.

The Appassimento process particularly benefits red wine made in cooler climates, however this method is not a miracle cure for bad quality grapes. The harvested grapes going into the Appassimento process must be of high quality and dried consistently to produce a premium wine.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. An apparatus for drying foodstuffs, comprising:
(a) a single moveable pallet having sides, a bottom and a top, the top of the pallet configured to support only one stack of containers from a bottom of the stack, the pallet comprising elongated support members forming a perimeter on which the stack is sealingly supportable, the top of the pallet comprising at least one aperture to permit air flow therethrough, the top, bottom and sides of the pallet defining a ventilation duct for receiving air through the top of the pallet, the at least one aperture in the top of the pallet situated directly below the stack of containers;
(b) a low pressure plenum in fluid communication and sealingly engaged with the ventilation duct, the low pressure plenum configured to draw air down vertically through the top of the pallet and out of the ventilation duct into the plenum; and,
(c) a plurality of foodstuff holding containers arranged in a vertical stack, the stack sealingly supported on the perimeter of the pallet,
wherein the containers comprise apertures in a bottom thereof configured to permit air flow at least from above the container through the bottom of the container, the stack of containers having sides, a bottom and a top, the sides of the stack sealed against air flow, the top and bottom of the stack open to air flow,
wherein the low pressure plenum draws air vertically down through the top of the stack through the plurality of containers through the bottom of the stack into the ventilation duct and out of the ventilation duct into the plenum,
wherein the vertical stack comprises a plurality of stacked rows of containers, each row of containers comprising a plurality of containers arranged so that a side of each container abuts a side of another container in the row, each row configured to have a substantially the same arrangement and perimeter as a neighboring row in the stack, whereby a bottommost row is sealingly supported on the perimeter of the pallet.

2. The apparatus according to claim 1, wherein the top of the pallet further comprises a cross-member positioned to support the vertical stack at an interface between at least two of the containers in the bottommost row.

3. The apparatus according to claim 1, wherein the low pressure plenum is in fluid communication with one of the sides of the pallet.

4. The apparatus according to claim 1, wherein the low pressure plenum is in fluid communication with the bottom of the pallet.

5. The apparatus according to claim 1, wherein a gasket provides for sealing the ventilation duct with the low pressure plenum.

6. The apparatus according to claim 1, wherein the low pressure plenum comprises a confined space in fluid communication with the ventilation duct and a fan for drawing air out of the ventilation duct.

7. An installation for drying foodstuffs, comprising: a climate controlled room, the room having a floor; and, an apparatus as defined in claim 1 situated in the climate controlled room.

8. The installation according to claim 7, wherein the climate controlled room controls temperature, relative humidity or both temperature and relative humidity of air in the room.

9. The installation according to claim 7, comprising a plurality of the apparatuses, wherein the low pressure plenum is one plenum for all of the apparatuses.

10. The installation according to claim 7, comprising at least one row of the apparatuses, wherein the ventilation duct of one of the apparatuses in a row is in fluid communication with the plenum, and the ventilation ducts of the other apparatuses in the row are sealingly engaged and in fluid communication with the ventilation duct of a neighboring apparatus in the row.

11. The installation according to claim 10, wherein a gasket provides for sealing the ventilation ducts of neighboring apparatuses to each other.

12. The installation according to claim 7, wherein a floor of the room defines a bottom of the ventilation duct.

13. The installation according to claim 12, wherein the bottom of the ventilation duct comprises an aperture defined by an aperture in the floor, and the low pressure plenum is provided beneath the aperture in the floor to draw air down through the bottom of the ventilation duct.

\* \* \* \* \*